United States Patent
Ferlitsch (10) Patent No.: US 7,158,254 B2
(45) Date of Patent: Jan. 2, 2007

(54) PRINT-JOB, PDL/RIP-INDEPENDENT DATA-MANAGEMENT METHOD AND SYSTEM

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 795 days.

(21) Appl. No.: 10/137,688

(22) Filed: May 1, 2002

(65) Prior Publication Data

US 2003/0206309 A1    Nov. 6, 2003

(51) Int. Cl.
*G06F 3/12*    (2006.01)

(52) U.S. Cl. .................... 358/1.15; 358/1.1; 358/1.13; 382/235; 382/233; 382/232

(58) Field of Classification Search ............... None
See application file for complete search history.

(56) References Cited

U.S. PATENT DOCUMENTS

| | | | | |
|---|---|---|---|---|
| 5,465,322 A | * | 11/1995 | Hsu et al. ................ | 358/1.15 |
| 5,528,734 A | * | 6/1996 | Sanchez ................... | 358/1.16 |
| 5,940,585 A | * | 8/1999 | Vondran et al. ............ | 358/1.15 |
| 6,002,814 A | * | 12/1999 | Chadez ..................... | 382/303 |
| 6,049,390 A | * | 4/2000 | Notredame et al. ........ | 358/1.15 |
| 6,184,997 B1 | * | 2/2001 | Hanyu et al. .............. | 358/1.15 |
| 6,204,933 B1 | | 3/2001 | Yoshino et al. | |
| 6,362,870 B1 | * | 3/2002 | Mui et al. .................... | 355/24 |
| 6,466,328 B1 | * | 10/2002 | Bradley et al. ............ | 358/1.15 |
| 6,711,294 B1 | * | 3/2004 | Hamzy et al. ............. | 382/232 |
| 6,941,019 B1 | * | 9/2005 | Mitchell et al. ........... | 382/232 |
| 2001/0055124 A1 | * | 12/2001 | Varga ....................... | 358/1.15 |
| 2003/0063309 A1 | * | 4/2003 | Parry ....................... | 358/1.15 |
| 2004/0196496 A1 | * | 10/2004 | Klassen .................... | 358/1.15 |

* cited by examiner

*Primary Examiner*—Edward Coles
*Assistant Examiner*—Beniyam Menberu
(74) *Attorney, Agent, or Firm*—Jon M. Dickinson, PC; Robert D. Varitz, PC

(57) ABSTRACT

A data management method and system for expediting the flow and handling of print data from a creation source to one or more printers. Data in a stream is examined in light of assessed available and capable printers, and is block boundaried accordingly to divide the stream appropriately into compressed and uncompressed data blocks. This activity, which occurs upstream from where rasterization occurs, and which results ultimately in the handing off of data to printers on a block-by-block basis, minimizes data traffic volume and increases data flow speed.

23 Claims, 10 Drawing Sheets

PRINT-JOB, PDL/RIP-INDEPENDENT DATA-MANAGEMENT METHOD AND SYSTEM

BACKGROUND AND SUMMARY OF THE INVENTION

This invention pertains to a method and a system for managing print-job data en route from the creation source of that data to one or more printer(s) which will be called upon to complete the print job. In particular, it relates to a novel concept involving PDL/RIP-independent selection of data boundaried blocks which, for subsequent compression and decompression purposes, and en route to one or more printers, are treated independently as managed blocks of data.

The method and system of the present invention significantly address the problem of reducing the amount of data transmitted over a local bus or over a network in relation to the management of various print jobs. Lying at the heart of the invention, in terms of achieving this problem solution, is the concept of examining print-job data to identify appropriate data-boundary areas of data which can be segregated, compressed and later decompressed as individual blocks. In one manner of practicing the invention, this boundaried block-handling approach is performed in relation to pre-assessing specific availabilities and capabilities of potentially usable printers, and then performing boundary selection, and block compression and decompression, to behave in a best-mode manner that relates to these discovered capabilities. By examining a print data stream, in light of knowledge or an assessment regarding the operational characteristics of the available one or more printers, an appropriate and efficient printing balance can be achieved between speed, data flow volume, and data rendering requirements and capabilities.

There are a number of specific ways of practicing the invention, particularly with respect to where the selection of block boundaries, and the implementation of compression and decompression, take place. The Tables, and the detailed block/schematic drawing figures, which are contained herein, word-labeled as they are, fully describe how these various practice approaches can readily be implemented by those skilled in the art. These drawings and Tables per se completely describe the invention and its practice, with little need for much added verbal amplification. The descriptive text which now follows proceeds with this fact in mind.

From a broad methodological point of view, the process of the invention can be described as including the steps of (a) interposing, in a print-job data stream, and a location which is functionally upstream from where data registration takes place, a capability for examining the data in that stream, (b) employing that capability, and according to a set of selectable, predetermined rules, establishing plural print-job-data-stream boundaries which thereby define boundaried blocks of data within the data stream, (c) utilizing another set of selectable, predetermined rules, and on a block-by-block (boundaried) basis, selectively compressing data within the boundaried blocks, (d) at a point in time following the compressing step(s) sending the blocks ultimately as individuals to a printer (or printers) for printing, and (e) as an output from a printer(s), delivering, in any appropriate selected format, a document product which completes the selected print job.

The structure of system of the invention is one which includes an appropriate collection of operatively connected hardware/software components that are designed to collaborate, and to implement the several steps just set forth in the preceding statement.

The various important features and special advantages that are offered and attained by the present invention will become more fully apparent as the description which now follows is read in conjunction with the accompanying, fully expository drawings.

DETAILED DESCRIPTION OF, AND MANNER OF PRACTICING, THE INVENTION

Turning now to the drawings, and referring first of all to FIGS. 1A, 1B, 1C and 2, these figures collectively illustrate, in a comprehensive way, the overall system and central methodology of the present invention. Both FIGS. 1A and 1B have upper and lower portions. These are employed herein to illustrate graphically the methodology of the present invention which involves examining a flow of print-data from a source of that data ultimately to one or more printers for the purpose of accessing where blocks of that data can be boundaried to describe certain blocks with respect to which data compression (en route to one or more printers) will aid in the speed of completing a print job, and in minimizing the volume of data traffic along the route between the source of the print job and the printer or printers. In each of these two figures, what is shown in the upper portion of the figure reflects a condition in a system performing in a manner absent the data management advantages offered in accordance with this invention, with the lower portions of these two figures graphically illustrating what takes place after implementation of the practice of this invention.

Figure 1A:
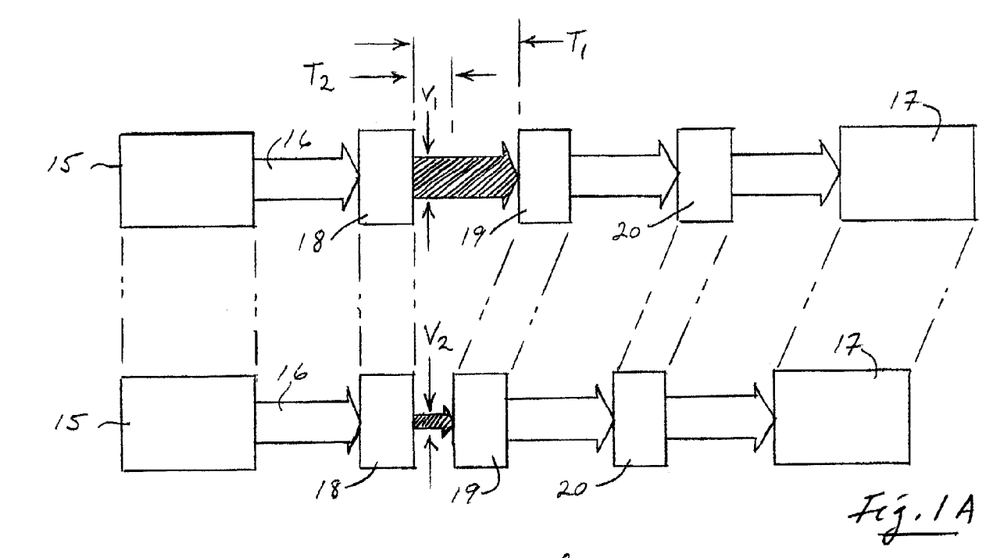
FIGS. 1A, 1B and 1C are block/schematic diagrams presenting an overview of the method and system of the present invention.

Accordingly, indicated in both the upper and lower portions of FIG. 1A, and at the left side of this figure, is a block 15 which represents the creation source for an initiated print-job data stream. That data stream is represented by an arrow 16. At the right side of FIG. 1A is a block marked 17 which represents one or more downstream printers, some or all of which are going to be called upon to complete the print-job that is expressed in data stream 16.

Illustrated Intermediate blocks 15, 17, for the purpose of symbolizing a system practicing the method of the present invention, are three blocks which are marked 18, 19 and 20. These three blocks just symbolize certain system componentry which might lie in the flow path for data coming from source 15. Extending from the right side of each of these blocks is a data arrow which points ultimately toward the region of printers 17.

For the specific purpose of illustration herein, let us assume that it is componentry and related software in block 18, which might be a printer driver, that perform and implement certain decisions and practices according to the invention. More specifically, the printer driver represented by block 18 is going to perform an examination of the print-job data stream for the purpose of identifying boundaries that can mark blocks of such data which might most preferably be compressed, and perhaps interleaved with uncompressed blocks of data, for handing off, one block at a time, ultimately to the printer or printers represented by block 17. The data flow from block 18 which would exist in the absence of practice of the present invention is represented by the arrow pointing outwardly to the right of block 18, which arrow is darkened with shading lines to emphasize its location. The length of this arrow, labeled by two arrows $T_1$ in FIG. 1A, reflects the length of time that might be occupied by the untreated flow of this data from block 18 to block 19. The arrows marked $V_1$, which generally designate the vertical thickness of this data-flow arrow in the upper portion of FIG. 1A, are intended to reflect the volume of data which, in the absence of practice of this invention, would flow en route from block 18 to block 19.

Figure 1B:
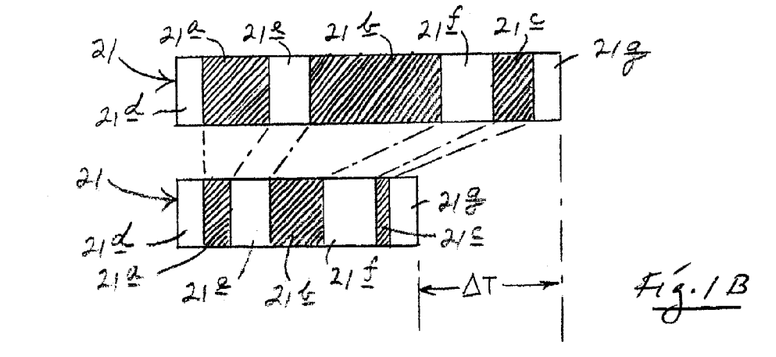

Shifting attention for a moment to the upper portion of FIG. 1B, the data which, in the absence of operation of the present invention, will flow between blocks 18 and 19 is represented by the rectangle marked 21 in FIG. 1B. The length of this rectangle is related to the time dimension just mentioned above designated by arrows $T_1$.

In accordance with practice of the invention, and completely independently of the format or character of the data in stream 16, and also quite independently of any printing language, steps are taken within block 18 to identify and mark the boundaries of several blocks within this data stream, darkened as three blocks in rectangle 21, which seem to be the most appropriate to compress en route to the region of the printers. These three darkened blocks are shown at 21a, 21b, 21c in FIG. 1B. As can be seen, these three identified blocks are interleaved, so-to-speak, with four other data blocks designated 21d, 21e, 21f and 21g in the upper portion of FIG. 1B. The respective lengths of these block (their horizontal dimensions in FIG. 1B) represent the times of transmission which would ordinarily be associated with them between blocks 18 and 19.

The lower sides of FIGS. 1A and 1B reflect graphically and symbolically what occurs with completion of the practice of the present invention, insofar as data compression is concerned. Beginning with what is shown in the lower portion of FIG. 1B, one will see that data blocks 21a, 21b, 21c have been significantly compressed in terms of how they appear in the upper portion of this figure, and the result is that the overall time during which the entire flow of data represented by rectangle 21 has been shrunk by an amount which is represented in FIG. 1B at T.

In FIG. 1A, this result of block boundary assigning and data compression appears in the lower portion of this figure with significant horizontal and vertical shrinkage of the size of the darkened arrow which extends between blocks 18 and 19. This changed arrow dimension is highlighted by that fact that in FIG. 1A, the lower portion of this figure, blocks 18 and 19 are shown closer together to reflect the shorter time required for conveyance of data between these two blocks, and the vertical dimension of the darkened arrow has diminished in the lower portion of FIG. 1A to reflect, as indicated by arrows $T_2$, a reduced volume of data (due to compression) which flows between these two blocks after practice of the invention.

As will become apparent, the "story" of the operation of the present invention which has been described in FIGS. 1A and 1B with respect to data flowing between two stylized blocks labeled therein as blocks 18 and 19, can take place, in accordance with different ways of practicing the invention, at other locations within a system operating in accordance with the present invention. Also, time and volume reductions which come from selective data blocking and compressing yields advantages and efficiencies downstream in the system, at least to the point where data decompression takes place.

Figure 1C:
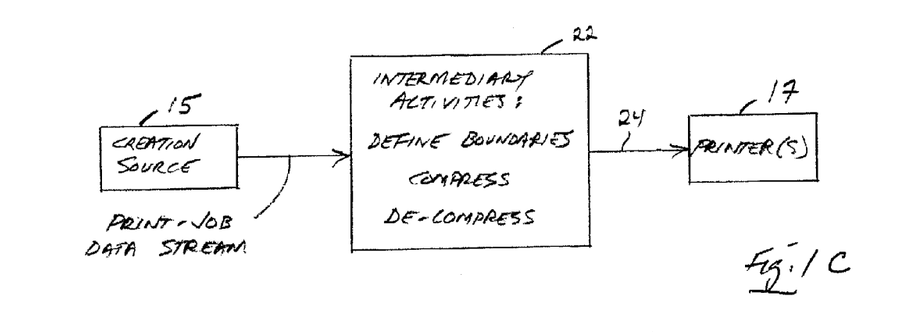

Turning attention now to FIG. 1C, from source 15, a print-job data stream flows to a block marked 22, wherein so-called intermediary activities are performed according to the invention. In general terms, and as was discussed somewhat with regard to FIGS. 1A and 1B, these activities include the examination of print-job data to identify (a) possible block boundaries for data, (b) subsequent appropriate compression of data within these boundaried blocks, and (c) later appropriate decompression. From block 22, ultimately, printer specific data is fed over a connection designated 24 in FIG. 1 to one or more printers which is (are) represented in FIG. 1C, as in FIG. 1A, by block 17.

Figure 2:
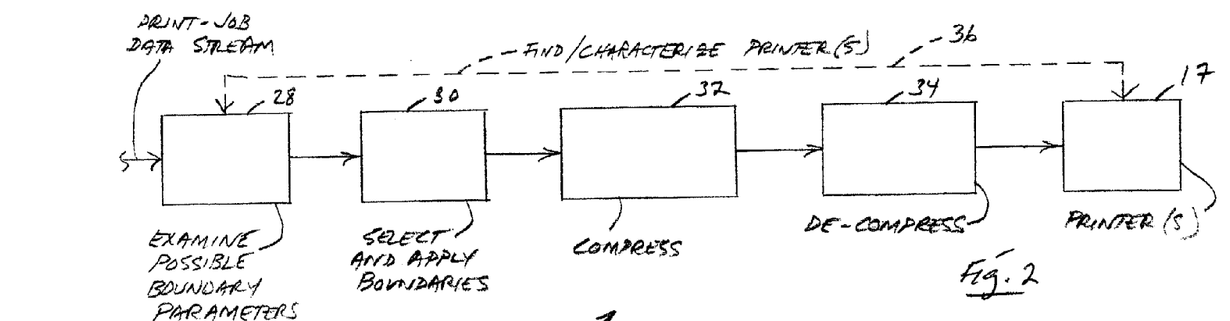
FIG. 2 is a block/schematic diagram further detailing block representations pictured in FIG. 1C, and specifically further picturing the methodology and system structures which make up the central block presented in FIG. 1C.

FIG. 2 presents a more detailed block representation of what takes place within block 22 shown in FIG. 1C. Shown in FIG. 2 as making up block 22 are additional blocks labeled 28, 30, 32, 34. From a systemic point of view, the elements of and within blocks 28, 30, 32, 34 may be located collectively or individually anywhere between creation source 15 and printer(s) 17.

Block 28 represents an initial activity which is performed on the source print-job data stream, namely the examination of that data stream for possibilities for defining boundary-able blocks of data. The result of this examination is fed, effectively, to block 30 which specifically detects and identifies block boundaries, and applies such boundaries. From block 30 information is fed to block 32, wherein the selected and boundaried blocks of data are appropriately compressed. Compressed blocks of data, interleaved with uncompressed data blocks are furnished to block 34 which, with regard to data blocks en route to one or more selected printers, applies appropriate data decompression. From block 34, decompressed data is applied to the one or more selected printers represented by block 17. Decompression symbolized by block 34 may take place, if so desired, within the realm of the printer(s) in block 17.

A dashed line 36 with arrow heads at both ends in FIG. 2, represents a modification of the system and methodology of this invention, wherein, and whereby, in association with the examination of possible boundary parameters for print-job data, an investigation also is made with respect to identifying currently available printers, and also the respective printing characteristics of these printers which might bear upon most efficiently defining compressible, boundaried blocks of data. Such an investigation and determination about possible usable printers is not itself a part of the present invention, can be implemented in a number of different conventional manners, and thus is not described herein in any further detail.

Figure 3:
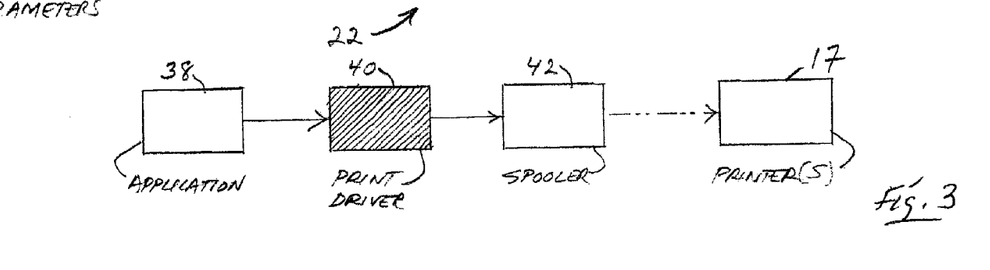
FIG. 3 is a block/schematic diagram illustrating print-job-data compression as performed by a printer driver.

Turning attention next to FIG. 3 in the drawings, here there are shown, upstream from block 26, three blocks 38, 40, 42 which generally illustrate print-job data boundary identification, print driver compression of selected boundaried blocks of this data, and then passage of that data ultimately through a spooler to the one or more downstream printers. Tables I, II, III, and IV below describe in detail four different ways for implementing the system and methodology illustrated in FIG. 3.

TABLE I

Driver Based Inline Compression - PCL 5e Example

Compression Block Begin
    Esc(#C    where # = run length
Compression lock End
    Esc)#C    where # = 0   unencoded
                where # = 1   run-length encoding
                where # = 2   tagged image file format (TIFF)
                where # = 3   delta row compression
                where # = 4   reserved
                where # = 5   adaptive compression

TABLE II

Driver Based Inline Compression - PCL XL Example

Compression Block Begin
    compress begin #    where # = run length
Compression Block End
    compress end #     where # = 0   unencoded
                       where # = 1   run-length encoding
                       where # = 2   tagged image file format (TIFF)
                       where # = 3   delta row compression
                       where # = 4   reserved
                       where # = 5   adaptive compression

TABLE III

Driver Based Inline Compression - Postscript Example

Compression Block Begin
    %%compress=#    where # = run length
Compression Block End
    %%nocompress=#    where # = 0   unencoded
                        where # = 1   run-length encoding
                        where # = 3   delta row compression
                        where # = 4   reserved
                        where # = 5   adaptive compression

TABLE IV

Driver Based Inline Compression - PDL Independent

Compression Block Begin
    %<#<%   where # = run length
Compression Block End
    %>#>%   where # = 0   unencoded TABLE IV-continued Driver Based Inline Compression - PDL Independent            where # = 1   run-length encoding
           where # = 2   tagged image file format (TIFF)
           where # = 3   delta row compression
           where # = 4   reserved
           where # = 5   adaptive compression In this implementation of the invention, the PDL language, or rasterization method, has built-in commands for partitioning print data in sequences of compressed and decompressed sections independent of the print-data. The printer driver employed, using a variety of algorithms for determining the most optimal trade-off of space reduction versus increased rendering time, selects zero or more partitions in the sequence of print data to compress.

When a partition is selected, the print driver uses a built-in language command sequence to denote the start of a compressed region, and the run length (i.e. the length of the print data in existence after compression), followed by the compressed print data, and terminated by a command sequence to denote the end of the compressed region, and the type of compression employed. Common compressions include, but are not limited to: run-length encoding, tagged-image file format (TIFF), delta-row compression, and adaptive compression.

For example, the print data could contain a long sequence describing certain drawing components of a page of a complex drawing using HP GL/2 graphics whose language contains no compression modes, that the printer driver determines would be optimal to compress. The HP GL/2 sequence of commands to compress, and the length of the compressed data would be determined. An uncompressed sequence would be replaced with the start compression command/run-length, compressed data, and terminated by the end compression command/compression mode.

The start and end compression command sequences could be implemented as command extensions to common PDL formats, or as a language-independent command sequence, as would be needed in a non-PDL (i.e., rasterization) situation.

Figure 4:
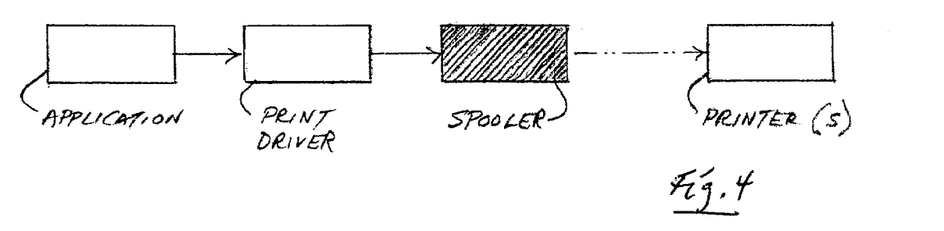
FIGS. 4 and 5 are companion different-level, block/schematic diagrams illustrating print-job-data compression performed by a spooler.
Figure 5:
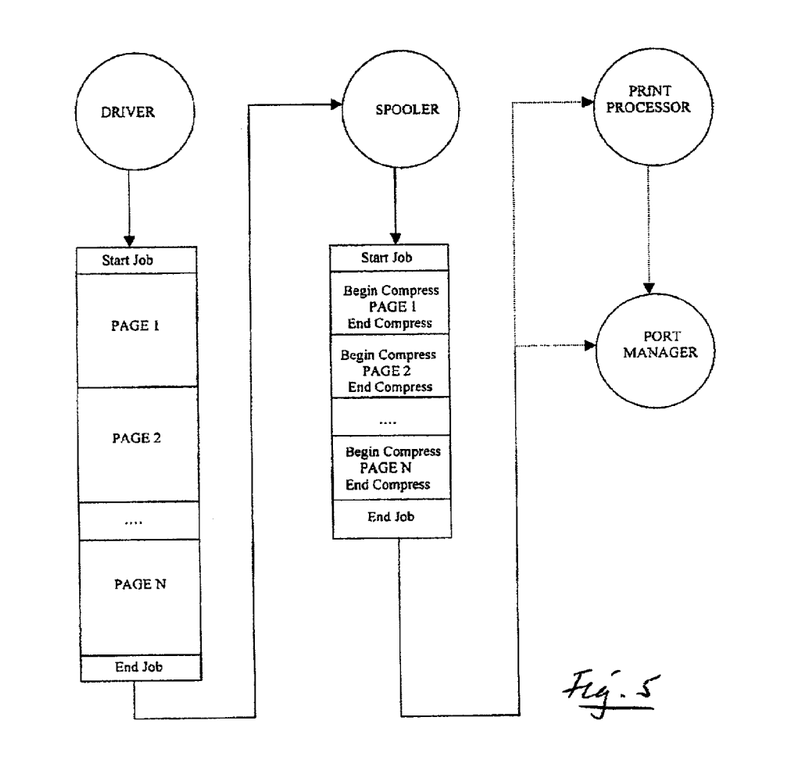

FIGS. 4 and 5, as well as Tables V, VI, VII below, describe spooler-based data block compression in accordance with the invention. In this embodiment of the invention, a spooler performs the required compression, and when this occurs compression can be performed independent of the printer driver.

TABLE V

The printer driver spools the uncompressed print data to the spooler using an API interface with the spooler, generally in the sequence:
    Start Job
        foreach page
            Start Page
                foreach data block in page
                      Write Data
            End Page
    End Job

TABLE VI

The spooler in the Microsoft Family of Operating Systems has an API call for each of the above steps:

```
hPrinter = OpenPrinter("printername");   //Open Handle to Printer
StartDocPrinter( hPrinter, ...)          //Start Print Job on Specified Printer
foreach page
    StartDocPage( hPrinter );            //Start Page on Printer
    foreach data block in page
        WritePrinter( hPrinter, ...);    // Write Page Data to Printer
    EndDocPage( hPrinter );              //End Page on Printer
EndDocPrinter( hPrinter );               // End Print Job on Printer
```

TABLE VII

The page compression could be implemented by enhancing the spooler API calls StartDocPage( ) and EndDocPage( ). These functions would perform the additional steps of:

StartDocPage( )

TABLE VII-continued

1. Save reference to the spool data storage (RAM or Disk) and offset
2. Setup a page buffer and redirect subsequent page data to this buffer.

EndDocPage( )
1. Compress the Page Buffer
2. Calculate length of compressed page data
3. Restore reference to the spool data storage and offset
4. Redirect subsequent page data to this buffer
5. Add Compression Begin Command and run-length of compressed page data
6. Add (i.e., copy, move or link) the compressed page data
7. Add the Compression End Command and compression mode.

If, in this implementation of the invention, the spooler "knows" the PDL type of print data, the spooler could then use the built-in compression command sequences for that PDL. Otherwise, the spooler would use a language-independent compression command sequence interleaved into the print-job data stream.

While this implementation of the invention as so far described, assumes that the print data is rendered (i.e., PDL or rasterized), the spooler could perform the same compression method on journaled data (e.g., EMF).

Figure 6:
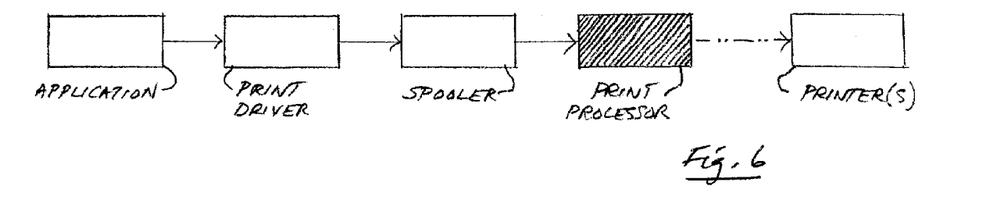
FIGS. 6 and 7 are companion figures which illustrate, with different levels of detail, print-job-data compression in accordance with this invention performed by a print processor.
Figure 7:
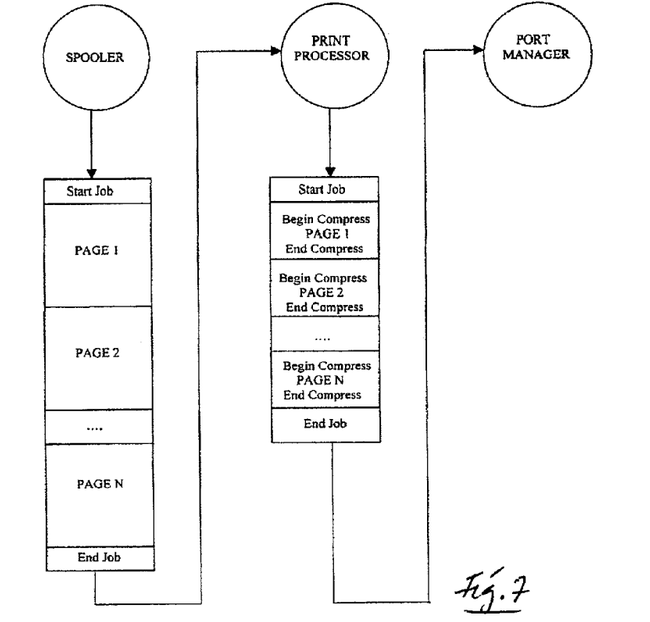

FIGS. 6 and 7 herein illustrate print processor based compression of boundaried data blocks in accordance with the invention. Table VIII below collaborates with these two drawing figures to illustrate and describe this embodiment and method of practicing the invention.

In this embodiment of the invention, a print processor performs the required compression. When, as here, compression is performed by a print processor in place of a printer driver, compression can be performed independently of the printer driver. In this implementation of the invention, the active spooler de-spools the print data to the print processor. In, for example, the Microsoft family of operating systems using an API interface between the spooler and the print processor, generally the following sequence is employed:

TABLE VIII

The spooler despools the print data to the Print Processor. In the Microsoft Family of Operating Systems, using an API interface between the spooler and the Print Processor, generally in the sequence:

```
OpenPrintProcessor( );                //Spooler invokes Print Processor to start Print Job
PrintDocumentOnPrintProcessor( );     //Spooler invokes Print Processor to read print data
hPrinter = OpenPrinter( );            //Print Processor opens connection to printer
while print data
    ReadPrinter( hPrinter );          //Print Processor reads print data from spooler
    WritePrinter( hprinter );         //Print Processor writes print data to printer
ClosePrintProcessor( );               //Spooler invokes Print Processor to end Print Job
ClosePrinter ( hPrinter );            //Print Processor closes connection to printer
```

Data block compression according to this manner of practicing the invention could be implemented, for example, by enhancing the print processor function PrintDocumentOnPrintProcessor. This particular function would typically perform the additional steps of:

1. Detecting (i.e., parsing) the beginning of a page of print data.
2. Redirecting subsequent read page data to a compression buffer.
3. Detecting (i.e., parsing) the end of a page of print data.
4. Compress the Page Buffer.
5. Calculate length of compressed page data.
6. Redirect subsequent page data to the printer.
7. Write Compression Begin Command and run-length of compressed page data to the printer.
8. Write (i.e., copy or move) the compressed page data tot he printer.
9. Write the Compression End Command and compression mode to printer.

Since the print processor will need to know the PDL type of the print data to parse that data, the print processor could then use built-in compression command sequences for that PDL. Alternately, the print processor could use a language-independent compression command sequence, interleaved into the print-job data stream.

While the description of this implementation of the invention has gone forward on the basis of an assumption that print data is rendered (i.e., PDL or rasterized), the print processor could perform the same compression on journaled data (e.g., EMF).

Figure 8:
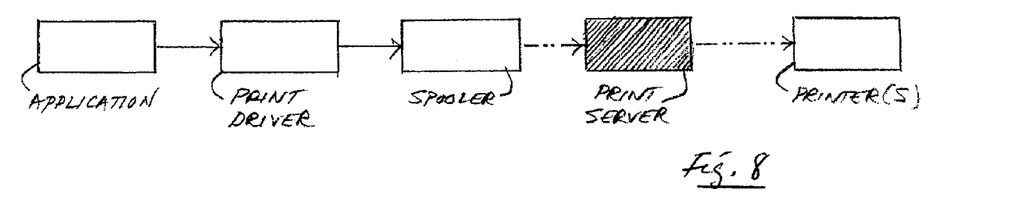
FIGS. 8 and 9 are also companion views presenting information at different levels of specificity, specifically picturing print-job compression performed by a print server.
Figure 9:
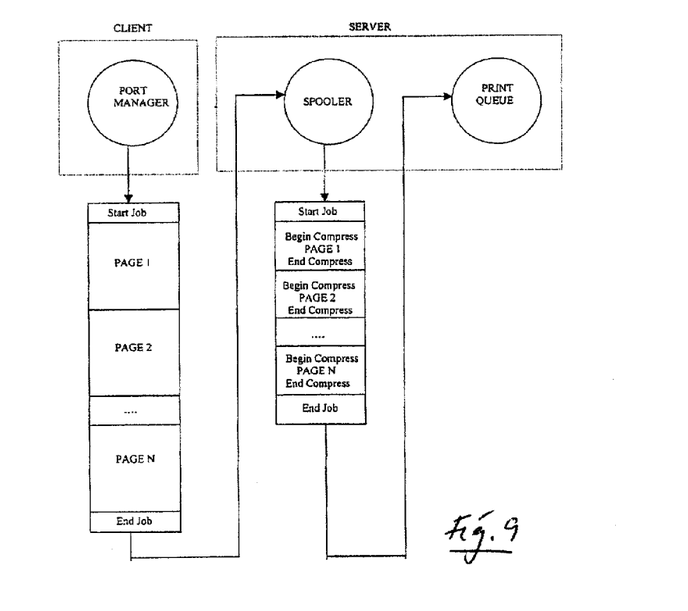

Turning attention now to FIGS. 8 and 9, here what is illustrated is block data compression performed by a print server in accordance with the invention.

In this embodiment of the invention, the print server performs compression activity. When compression is done by a print server and not by the printing source, compression can be performed independent of the printing source. (i.e., with no changes to the client computing device's printing environment).

In this implementation, the client computing device despools print data to the print server. That print data may be rendered or journaled. If the print data is journaled, the print server's printer driver, spooler, or print processor may perform compression on the printed data, generally as described above herein. If the print data is rendered, then the print server's spooler or print processor may perform compression on the print data, also as described earlier herein above. Similar compression approaches can be employed both with print data which is rendered, as well as in relation to print data which is journaled.

Figure 10:
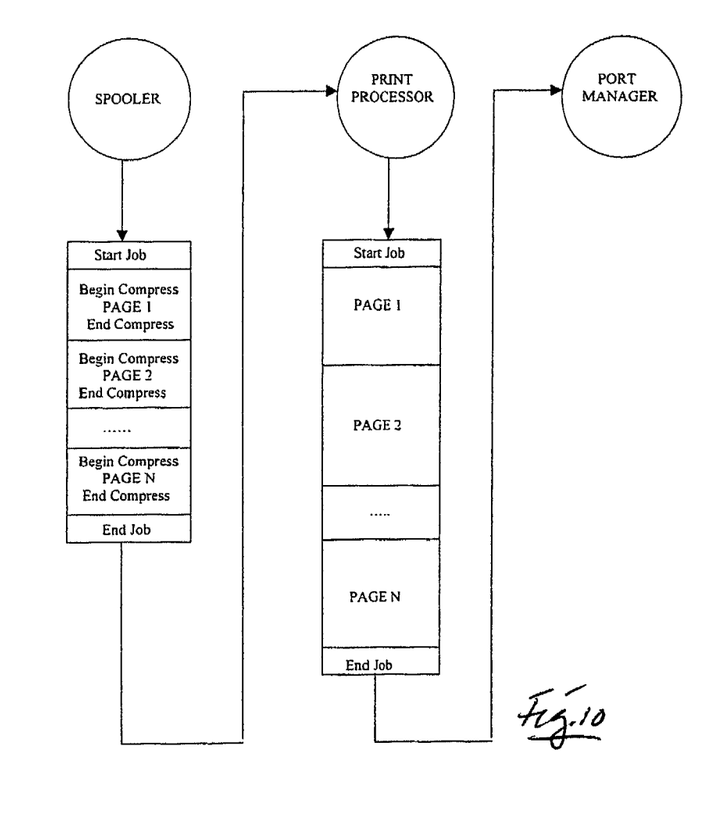
FIG. 10 is a block/schematic diagram illustrating print processor decompression of previous block compressed print-job-data.

FIG. 10 herein illustrates one approach that can be employed to de-compress block-boundaried compressed data, and specifically illustrates decompression by a print processor.

If, in this implementation of the invention, print data has previously been compressed by a spooler, or alternately in-line compressed by a printer driver, the print processor may perform decompression, for example, by decompressing a single page of data at a time, in the context of writing print data on a per-page basis to the port manager of the specified printing device.

Page decompression here could be implemented by enhancing the print processor function PrintDocumentOnPrintProcessor which would perform, for example the additional steps of:

1. Detecting (i.e., parsing) the begin compression command sequence.
2. Reading the run-length of the compressed print data from the begin compression command.
3. Buffer the subsequent run-length print data into a decompression buffer.
4. Detecting the end compression command sequence
5. Reading the compression mode from the end compression command.
6. Decompressing the compressed print data (page or inline).
7. Writing the decompressed print data to the port manager of the specified printing device.

This implementation of decompression can be employed both with respect to rendered and journaled data.

Figure 11:
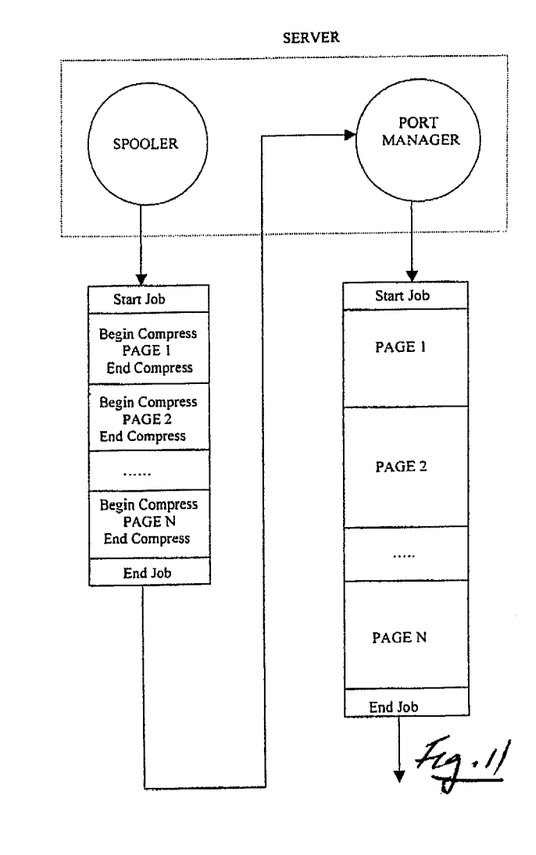
FIG. 11 is a block/schematic diagram illustrating decompression as performed by a print server.

FIG. 11 in the drawings illustrates boundary block data decompression employing a print server.

In this embodiment of the invention, if print data has been page compressed by the client computing device's spooler or print processor, or alternately inline compressed by the printer driver, the print server may perform page decompression. The print server's print processor decompresses a single page at a time under circumstances of writing print data on a per page basis to the port manager of the specified device. This implementation of the invention is employable both with rendered and with journaled data.

Figure 12:
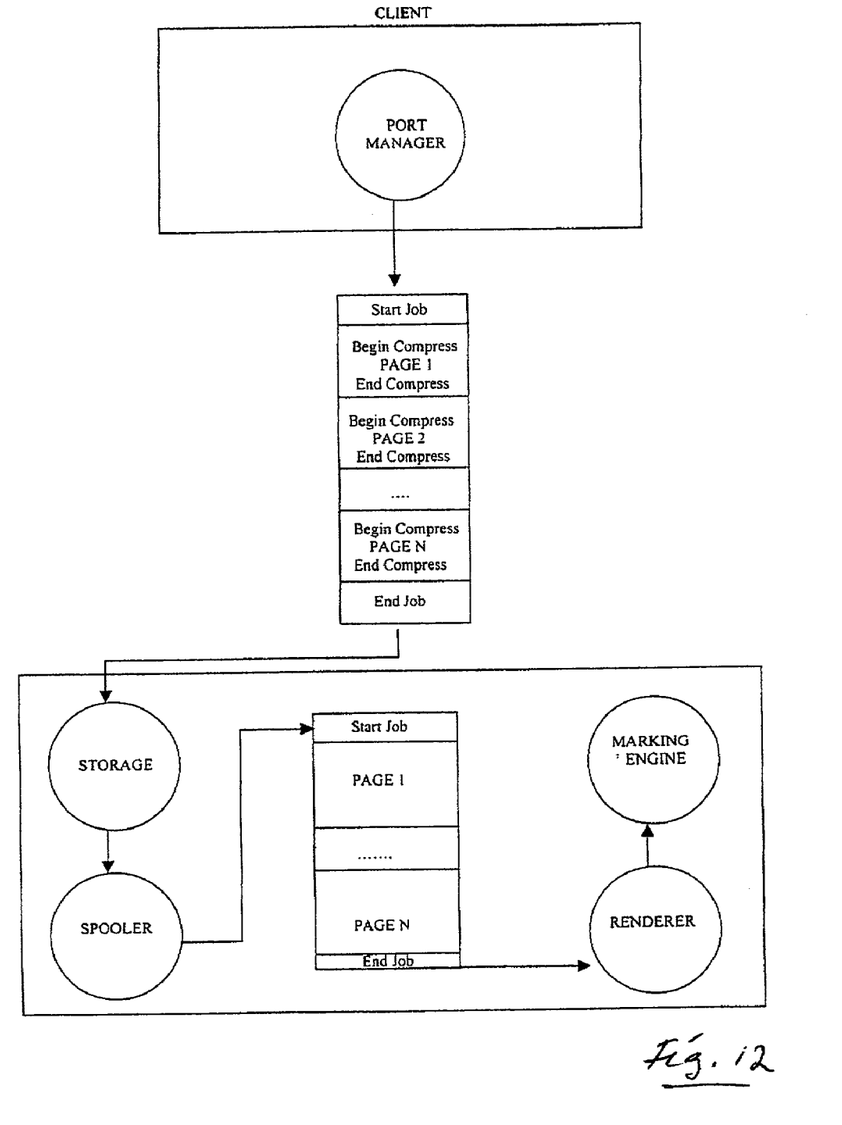
FIG. 12 is a block/schematic diagram illustrating one form of firmware-implement print-job-data decompression.

FIG. 12 illustrates firmware inline decompression of boundaried block data according to the invention.

In this implementation of the invention, if print data has been page compressed or inline compressed by the client computing device, or by the print server, the firmware of the specified printing device may perform decompression of the print data. FIG. 12 clearly shows the flow and the logic of activity according to this implementation of the invention.

Figure 13:
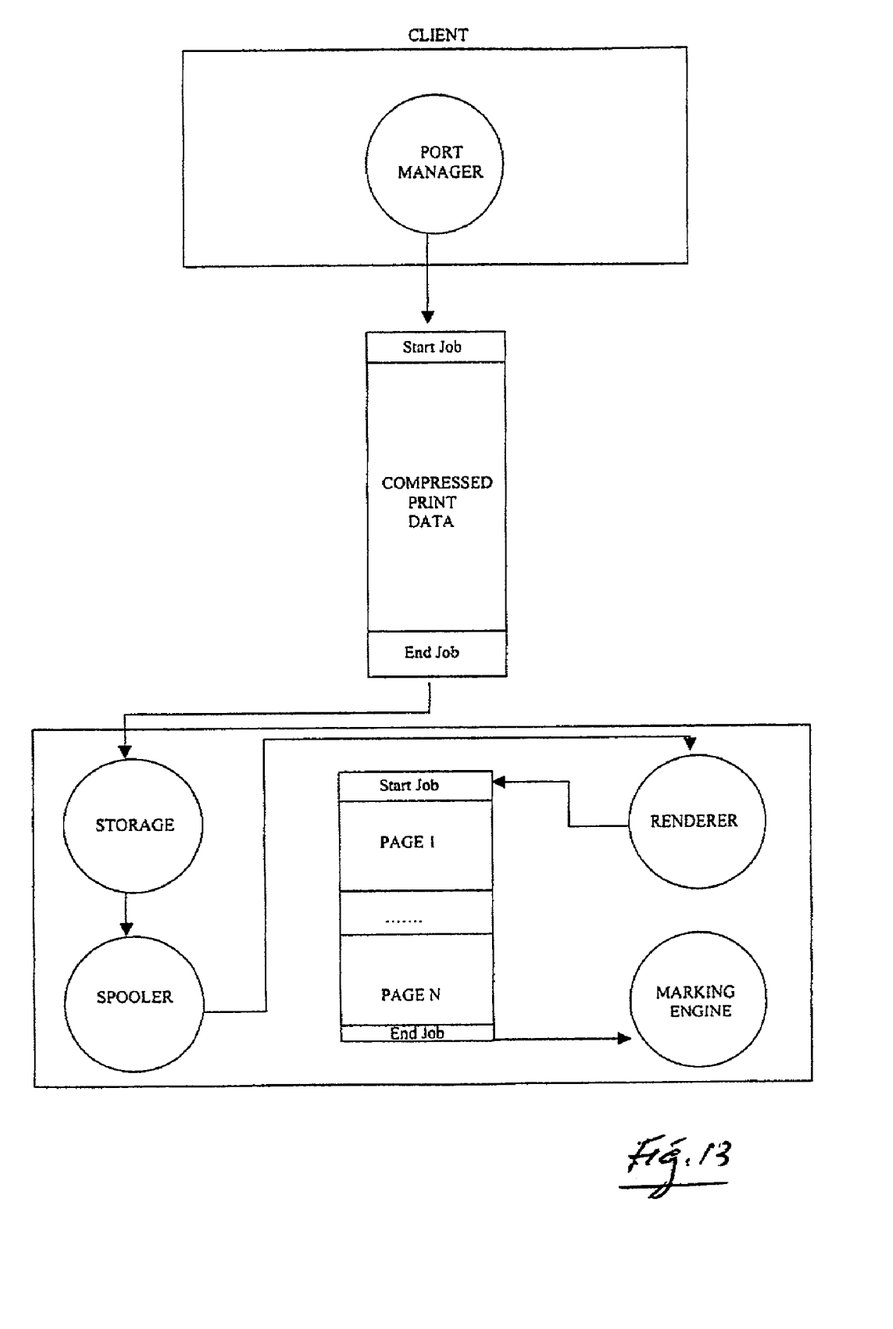
FIG. 13 illustrates firmware in line print-job-data decompression in accordance with the present invention.

FIG. 13 illustrates firmware inline decompression of boundaried block data according to the invention. Here too, the information clearly presented in FIG. 13 fully outlines the logic and flow of activities and operations in accordance with this implementation of the invention.

Figure 14:
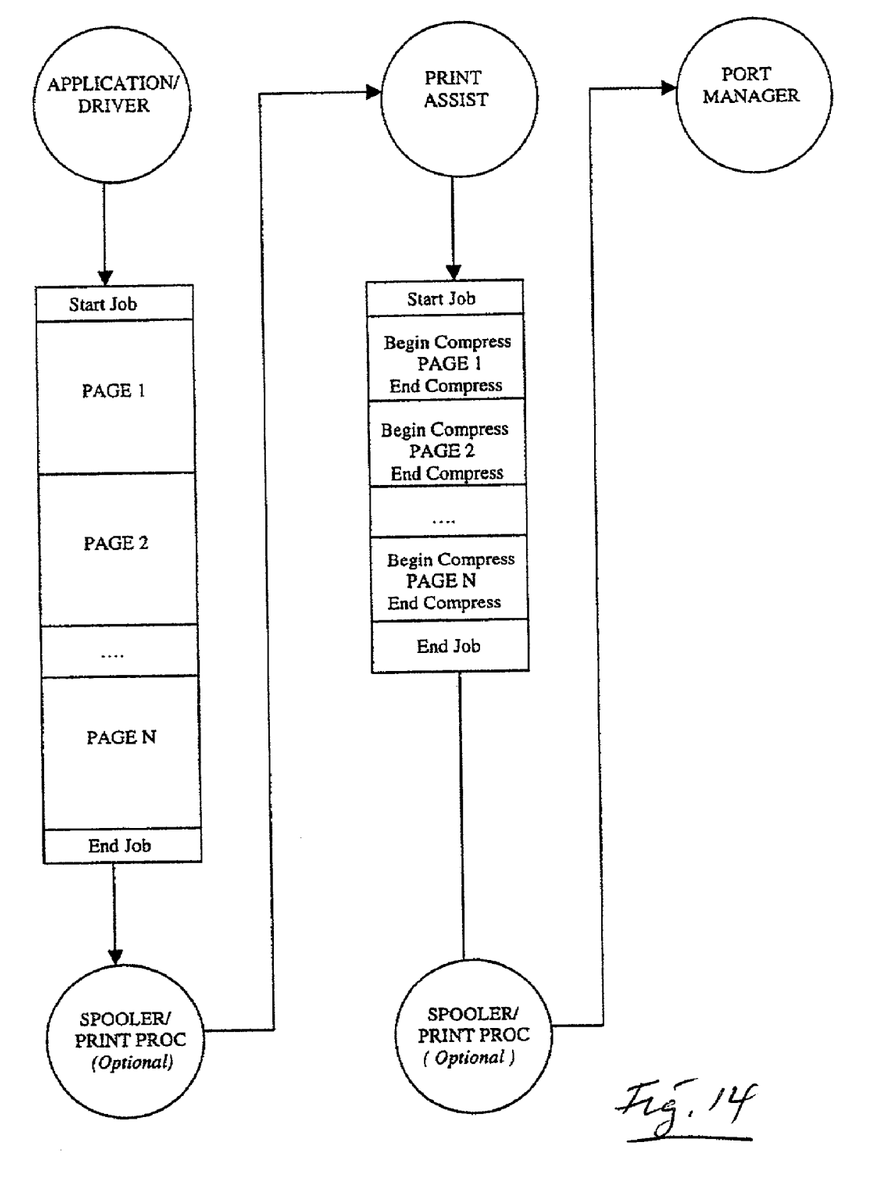
FIG. 14 illustrates print-job-data compression performed by a print assist in accordance with the present invention.
Figure 15:
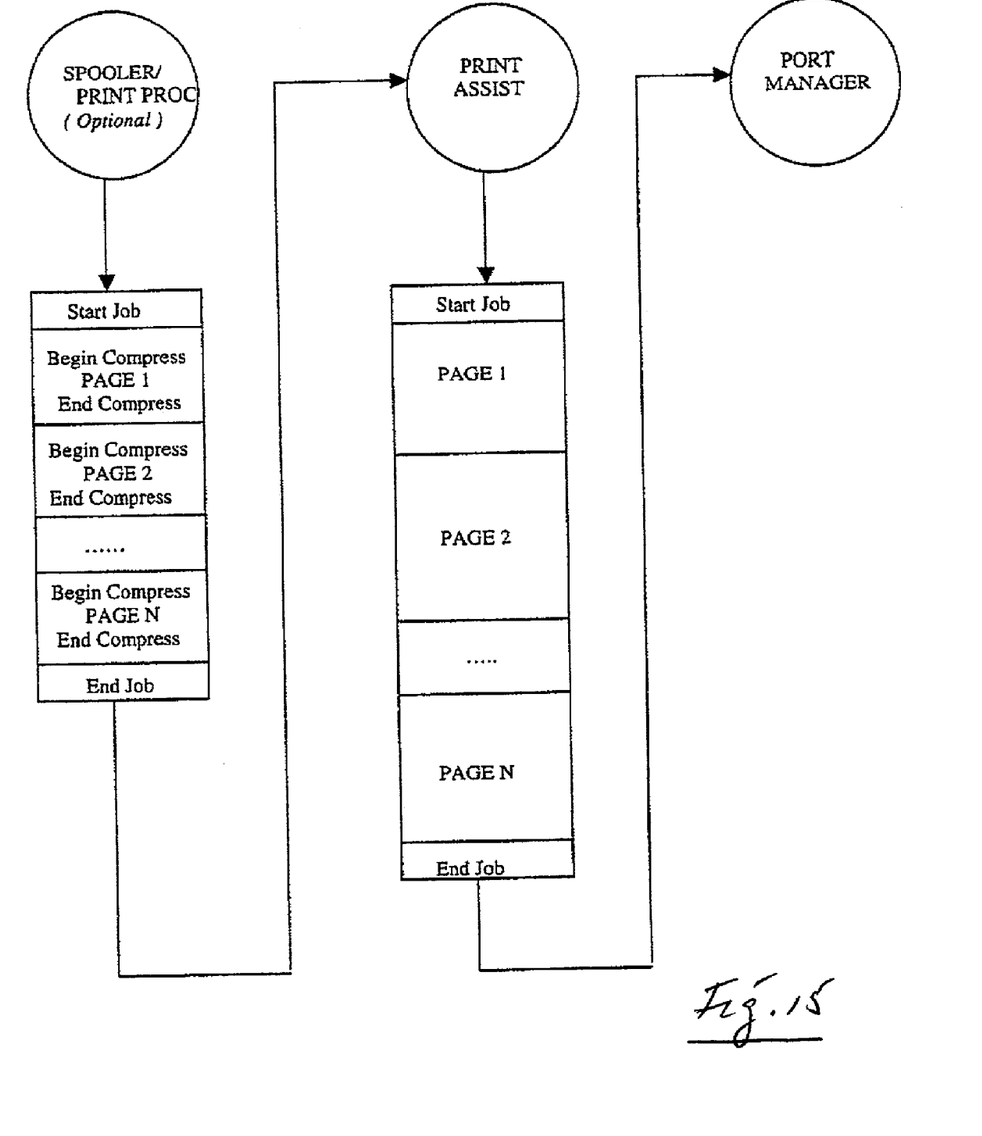
FIG. 15 illustrates print-job-data decompression performed by a print assist in accordance with the invention.

FIGS. 14 and 15 are companion drawings illustrating, in the case of FIG. 14, print assist decompression of boundaried block data in accordance with the invention, and in the case of FIG. 15, print assist decompression of boundaried block data. As is true with the other block/schematic diagrams herein, FIGS. 14 and 15 are fully explanatory to those generally skilled in the art.

Accordingly, a unique methodology and system for handling print-job-data, by employing block boundary definitions, and block compression and decompression as described above, has been proposed by the present invention for significantly improving print data management by reducing the potential level of local or network traffic during the management of print jobs, and by speeding the process of job completion.

While various embodiments of the invention have been described an illustrated herein, it appreciated that other variations and modifications are possible without departing from the spirit of the invention.

I claim:

1. Print-job, data-stream management related to a stream of selected, job-specific print data which is intended to flow from a print-job source to one or more downstream printer(s) having a print engine(s), and in which data-stream data compressing is to take place, with such compressing being performed, under all circumstances, only upstream from where rasterization takes place, said management comprising interposing in such a stream, at a location which is functionally upstream from where rasterization takes place, a capability for examining data in the stream, with that capability in place, examining the stream, and from said examining, selecting and establishing at least one pair of print-job-data stream boundaries that define a related, boundaried, selectively compressible block of data within the stream, after said selecting and establishing steps, and for subsequent transmission along and within the stream, in a region therealong which is intermediate where compressing is performed and the location(s) of such one or more printer(s), selectively compressing data within the boundaried block, only upstream from where rasterization takes place, thus to create a modified data stream which now includes a boundaried, compressed block of data, with or without an accompanying other block or blocks of uncompressed data, and following said selective compressing, effectively sending the modified data stream, as individual blocks, to the downstream printer(s)'s print engine(s) for printing.

2. The method of claim 1 which is practiced in a system wherein the print-job source is a computer-based application, and the examining capability is installed in place in that system at a location which is downstream relative to such application.

3. The method of claim 1 which is practiced in a system wherein, downstream from the print-job source and upstream from the one or more printer(s), there is a spooler wherein said boundary selecting and establishing, and said compressing, activities are performed.

4. The method of claim 1, wherein the print-job data stream is created within an application installed in a computer, and said boundary selecting and establishing, and said compressing, activities are performed by a printer driver which is disposed operationally downstream from the application.

5. The method of claim 1, wherein, downstream from the print-job source, is a print processor, and said boundary selecting and establishing, and said compressing, activities are performed by the print processor.

6. The method of claim 1, wherein all activities take place within a system which includes a print server, and said boundary selecting and establishing, and said compressing, activities are performed by the print server.

7. The method of claim 1, wherein said boundary selecting and establishing is performed by a print assist which forms part of a system implementing the invention.

8. The method of claim 1, wherein said boundary selecting and establishing activity is variable and adaptable from print-job to print-job.

9. The method of claim 1, wherein boundary selecting and establishing activities are optimized for one or more printer(s) selected from the one or more downstream printer(s), with optimization occurring in a manner which allows the selected one or more printer(s) to begin printing each sent block of data without reference to the receipt of any other send block of data.

10. The method of claim 1, wherein data boundaries are selected on a per-physical-printed sheet basis.

11. The method of claim 1 which further comprises, after implementation of said sending step, print-processor-performed decompression of a block or blocks of compressed, sent data.

12. The method of claim 1 which further comprises, after implementation of said sending step, print-server-spooler-performed decompression of a block or blocks of compressed, sent data.

13. The method of claim 1 which further comprises, after implementation of said sending step, printer-performed decompression of a block or blocks of compressed, sent data.

14. A print-job, data-stream managing system which operates in a manner that is independent both of print data format, and of specific printing language format, and with respect to which data compressing is to occur, but only upstream from where rasterization takes place, said system comprising a data-stream source of print-job data, at least one printer located, data-stream-wise, downstream from said source, and intermediary structure operatively interconnecting said source and said at least one printer at a location in the system which is upstream from where rasterization takes place, operable to implement, with respect to such print-job data, and only upstream from where rasterization occurs, selective block-boundary-defining and data-compression activities relative to portions of such data, and en route of that data between said source and said printer.

15. The system of claim 14 which further comprises, within said intermediary structure, a printer driver which performs the mentioned block-boundary-defining and data-compression activities.

16. The system of claim 14 which further comprises, within said intermediary structure, a spooler which performs the mentioned block-boundary-defining and data-compression activities.

17. The system of claim 14 which further comprises, within said intermediary structure, a print processor which performs the mentioned block-boundary-defining and data-compression activities.

18. The system of claim 14 which further comprises, within said intermediary structure, a print server which performs the mentioned block-boundary-defining and data-compression activities.

19. The system of claim 14, wherein said intermediary structure is further operable to implement appropriate data decompression.

20. The system of claim 19 which further comprises, within said intermediary structure, a print processor which performs the mentioned data decompression.

21. The system of claim 19 which further comprises a print assist which performs the mentioned data decompression.

22. The system of claim 19 which further comprises, within said intermediary structure, a print-server spooler which performs the mentioned data decompression.

23. The system of claim 14, wherein said printer is constructed to perform received-data decompression.

* * * * *